Figure 1:
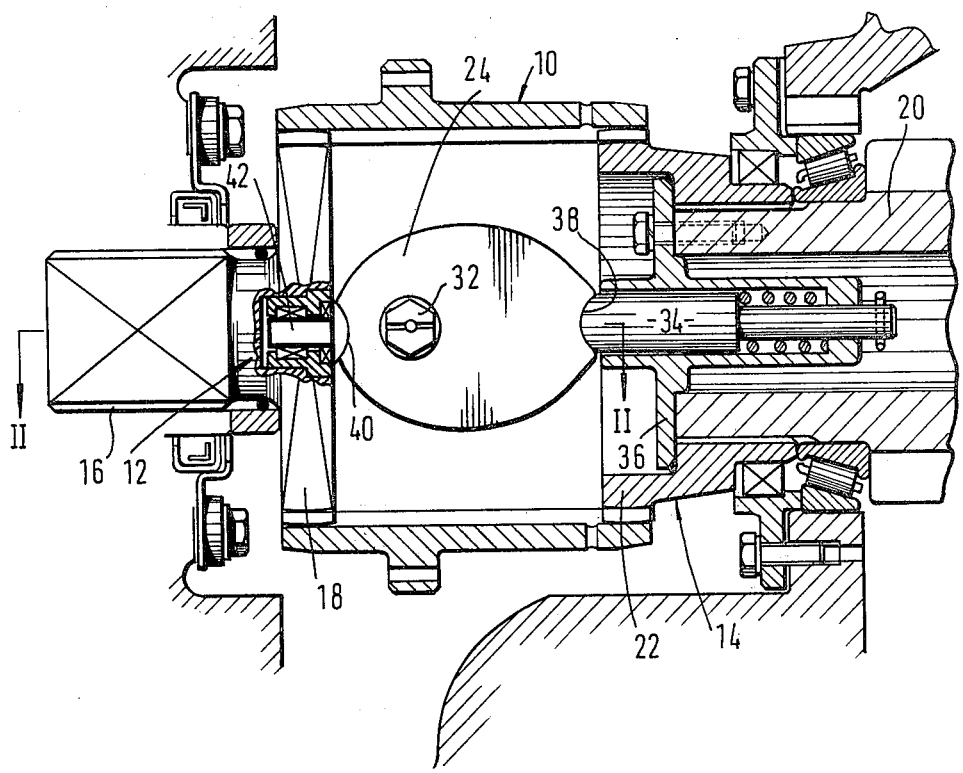

United States Patent [19]

Powell

[11] 4,326,615

[45] Apr. 27, 1982

[54] MECHANICAL COUPLING ASSEMBLY

[75] Inventor: Robin F. Powell, Stafford, England

[73] Assignee: GKN Sankey Limited, Bilston, England

[21] Appl. No.: 93,382

[22] Filed: Nov. 13, 1979

[30] Foreign Application Priority Data

Nov. 22, 1978 [GB] United Kingdom ............... 45603/78

[51] Int. Cl.³ .............................................. F16D 11/00
[52] U.S. Cl. ................................ 192/93 R; 192/67 R; 74/337.5
[58] Field of Search ................. 192/93 R, 93 A, 93 B, 192/93 C, 70.19, 70.23, 70.24, 67 R; 74/337.5; 64/9 R, 28 R

[56] References Cited

U.S. PATENT DOCUMENTS

| 1,081,861 | 12/1913 | Pagani | 192/93 R |
| 2,486,715 | 11/1949 | Koster | 192/67 R |
| 2,888,087 | 5/1959 | Duncan | 192/93 R |
| 3,249,188 | 5/1966 | Maina | 192/67 R |
| 3,910,131 | 10/1975 | Richards | 192/67 R |

FOREIGN PATENT DOCUMENTS 996123  5/1964  United Kingdom ............ 192/67 R

Primary Examiner—George H. Krizmanich
Attorney, Agent, or Firm—Merriam, Marshall & Bicknell

[57] ABSTRACT

A mechanical drive assembly includes driving and driven gear members with an internally splined coupling sleeve for engagement with said members. The sleeve includes a locking cam carried internally and being selectively actuable to move the sleeve between coupling-engaged and coupling-disengaged positions. The axis of rotation of the cam is offset from the central axis thereof whereby, when the cam is rotated through 180° from the coupling-engaged position, the sleeve is moved forceably away from the driving member. Such movement of the sleeve is effected either by direct engagement of the cam face upon the driving gear member or by engagement of a cam follower on the driven gear member with a cam track.

7 Claims, 5 Drawing Figures

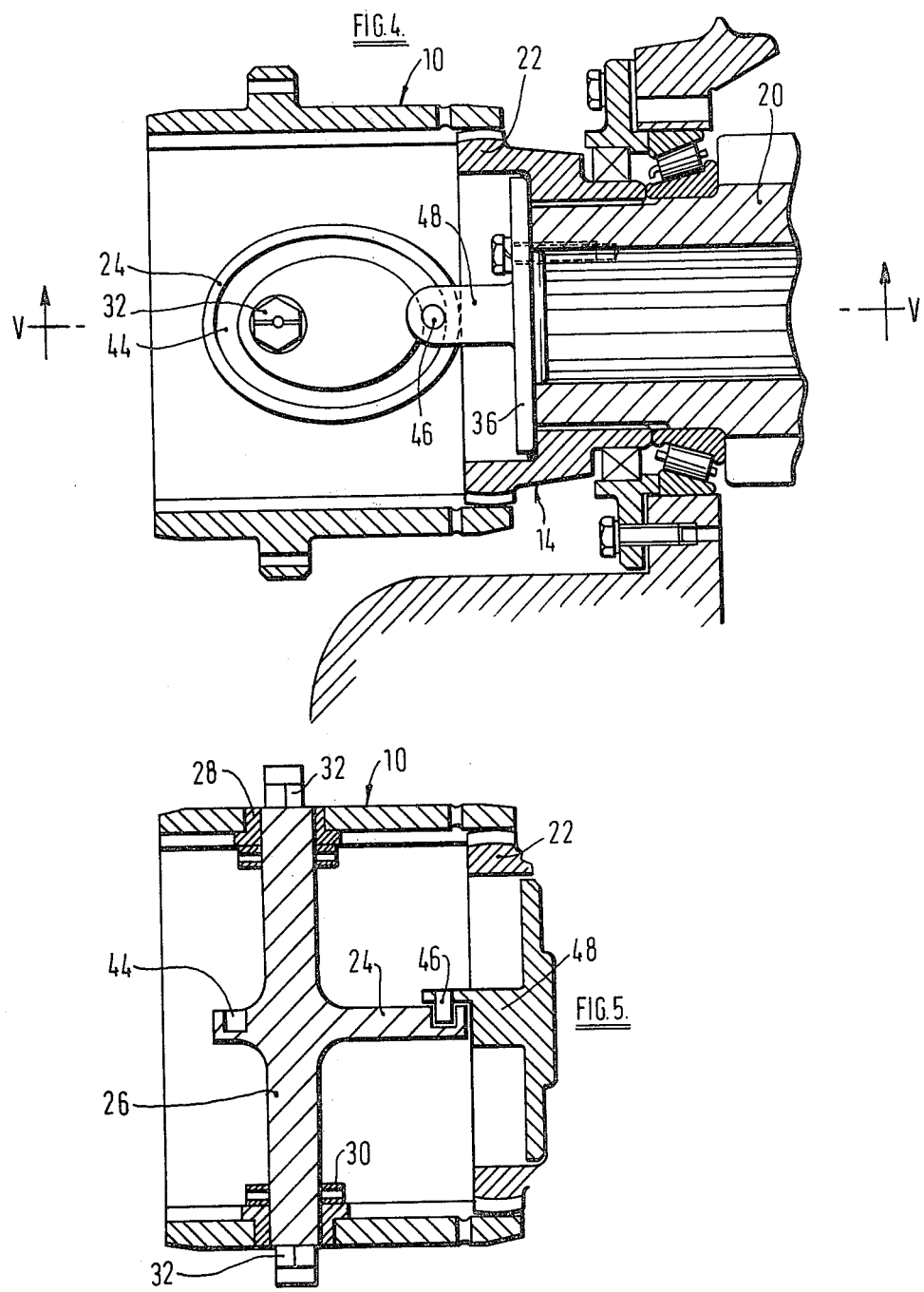

MECHANICAL COUPLING ASSEMBLY

This invention relates to a mechanical coupling between a driving and a driven member. Particularly, but not essentially, the invention relates to a coupling between a driving member comprising part of a first gearbox and a driven member comprising part of a second gearbox of the type utilised in heavy duty on or off the road vehicles and wherein the coupling may be required to accommodate some degree of misalignment between the driving and driven member.

It is an object of the invention to provide an improved construction of a mechanical coupling for use between driving and driven members.

In accordance with the invention there is provided a mechanical drive assembly comprising a driving gear member, a driven gear member axially spaced therefrom and a mechanical coupling therebetween wherein the coupling is provided with gearing to co-operate with said driving and driven gear members whereby rotational drive may be transmitted through the coupling from said driving gear member to said driven gear member; said coupling being axially moveable relative to said gear members so as to be selectively disengageable from at least one of said members, and said coupling including locking means carried by said coupling actuable selectively between a first position in which said coupling is maintained in engagement with both of said gear members and a second position in which said coupling is maintained in disengagement from one of said gear members.

The locking means conveniently comprises a cam member rotatable between its said first and second positions, said cam being positively engageable with at least one of said gear members and wherein rotation of said cam causes movement of the coupling between its engaged and disengaged positions. The cam member may include opposed cam faces for respective engagement with axially opposed faces of the driving and driven gear members and movement of the cam through 180° preferably causes the coupling to move from its engaged position with both of said gear members to its disengaged position in which it is disengaged from the driving gear member. In the disengaged position of the coupling the cam member may conveniently remain engaged with the axially opposed faces of both of said driving and driven gear members.

In both of the engaged and disengaged positions of the coupling, one said cam face may be engaged directly with the driving gear member and the opposed cam face may be engaged with a resiliently biased plunger carried by the driven gear member.

In an alternative form of the cam member it may include a circumferential cam track engaged by a cam track follower carried by one of the gear members. Preferably the cam track follower is carried by the driven gear member whereby rotation of the cam through 180° causes movement of the coupling from its engaged position with both of said gear members to its disengaged position wherein it is disengaged from the driving gear member.

The coupling itself may comprise a sleeve having internal gearing thereon at or adjacent each of its ends for respective co-operation with said driving and driven gear members and the cam member may be mounted within the sleeve for rotation about an axis extending diametrically across the sleeve intermediate its ends.

Figure 2:
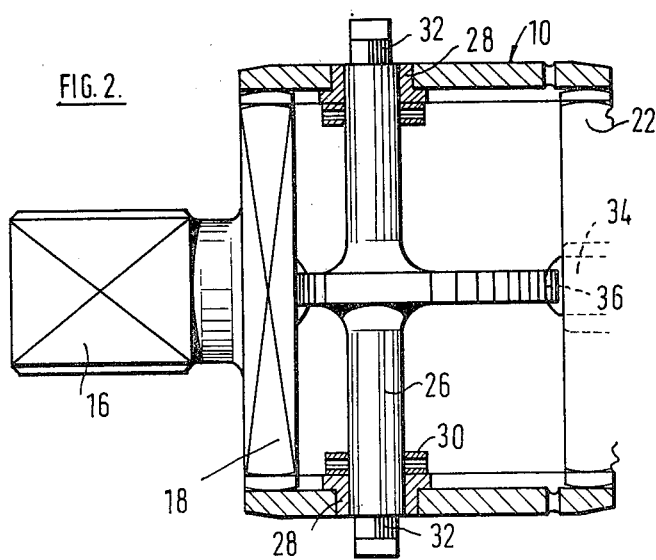
Figure 3:
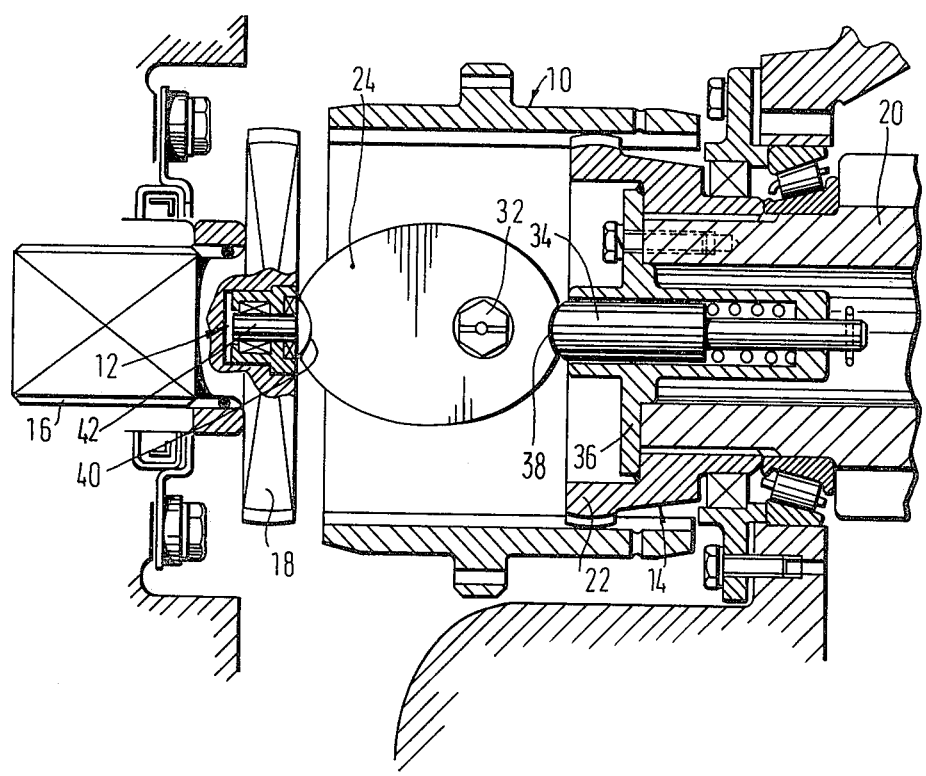

Other features of the invention will become apparent from the following description given herein solely by way of example with reference to the accompaning drawings wherein:

FIG. 1 is a side sectional view showing a coupling in accordance with the invention engaged between driving and driven gear members, FIG. 2 is a transverse cross-sectional view on the line II—II of FIG. 1, FIG. 3 is a similar view to that of FIG. 1 but showing the coupling in its disengaged position, FIG. 4 is a side sectional view showing an alternative construction of locking means in a coupling according to the invention, and FIG. 5 is a part cross-sectional view on the line V—V of FIG. 4.

In the drawings there is illustrated a sleeve mechanical coupling 10 of the type shown as a muff coupling. In this embodiment the coupling 10 constitutes part of a mechanical drive assembly between a driving gear member 12 and a driven gear member 14 said members themselves comprising parts of driving and driven gearbox units in the transmission line of a heavy vehicle. The driving member 12 includes a driving shaft 16 having a gear wheel 18 secured to an axial outer end of the shaft; the diameter of the gear wheel being substantially greater than that of the shaft and being provided around its outer periphery with a complete set of gear teeth having crown profiles. The shaft 16 is externally longitudinally splined to be fitted within a co-operating internally splined element of the driving gearbox; there being no positive retention of the shaft 16 against axial movement outwardly of the gearbox except as described herein.

The driven gear member 14 includes a driven shaft 20 having a driven gear wheel 22 secured to one axial end thereof and being of the same external diameter as that of the driving gear wheel 18. Similarly the driven gear wheel 22 is provided with a complete set of gear teeth around its outer periphery which are also of a crowned profile.

The muff coupling 10 comprises a sleeve of circular cross-section internally longitudinally splined to mesh at each of its ends with the teeth of the driving and driven gear wheels 18 and 22. It will be appreciated that the provision of the crown teeth on the driving and driven gear wheels will permit some degree of misalignment between the axes thereof which typically may be of the order of plus or minus 4°. It should also be appreciated that the sleeve need not be splined over its full length but need only be provided with internal teething at or adjacent its ends sufficient to mesh with the teeth of the driving and driven gear wheels 18 and 22.

In order to prevent undesirable axial movement of the coupling 10 relative to the driving and driven gear wheels 18 and 22 the sleeve is restrained against axial movement by means of a cam 24 itself mounted for rotation on a shaft 26 extending diametrically across the sleeve. The cam 24 is mounted centrally of the shaft 26 whilst each end of the shaft is located in bushings 28 in the wall of the sleeve 10 and secured against movement diametrically of the sleeve by collar and pin locking assemblies 30. Each end of the shaft 26 projects radially outwardly of the wall of the sleeve 10 and is provided with a flatted head 32 for engagement by a suitable tool to effect manual rotation of the cam between coupling-engaged and coupling-disengaged positions. The cam 24 is thus rotatable about an axis, i.e. the longitudinal axis of the shaft 26, which is normal to the axis of rotation of the coupling 10. As will be seen clearly from the drawings, the axis of the shaft 26 is offset laterally from the centre axis of the cam 24 for a purpose described in more detail below.

The driven member 14 includes a spring loaded plunger 34 carried on a web member 36 for rotation with the shaft 20. The plunger is provided with a rounded outer end and is spring biased axially outwardly of the driven member 14 towards the driving member 12. One bearing face of the cam 24 is provided with a curved recess 38 complementarily shaped for engagement by the rounded outer end of the plunger 34. The degree of curvature of the end of the plunger 34 and the recess 38 is such that manual rotation of the cam on its shaft 26 can be effected to cause the recess to run on or off the end of the plunger when the cam is being rotated between its coupling-engaged and coupling-disengaged positions. The degree of axially outward movement of the plunger 34 is such that it can exert a force on the cam at all times during its rotation about its shaft 26.

The opposed cam face of the cam 24 i.e. that face diametrically opposite to the recess 38, is also provided with a similarly curved recess 40. The centre portion of the driving gear wheel 18 is provided with a freely rotatable bearing button 42 having a domed head protruding proud of the axial end face of the gear wheel 18 so as to be engaged within the recess 40 when the cam is in the coupling-engaged position of FIG. 1.

In order to assemble a transmission assembly utilizing a muff coupling of the type described herein the coupling itself is first pre-assembled with the cam 24 on its shaft 26. With the cam 24 in its unlocked position i.e. rotated through 90° from the position shown in FIG. 1 of the drawings the gear wheels 18 and 22 are meshed into the splined interior of the sleeve 10. The cam 24 is then rotated through 90° to the coupling-engaged position shown in FIG. 1 of the drawings wherein one bearing face of the cam engages with the axially outer surface of the driving gear wheel 18 and the opposed face of the cam having the recess 38 engaged with the plunger 34. In this position the sleeve 10 is restrained against undesirable axial movement relative to the driving and driven gear members and is retained in position by the spring loaded plunger 34.

In some circumstances it may be desirable to uncouple the driven gearbox unit from the driving gearbox unit, for example, when the vehicle is being towed. In such a situation the cam 24 may be rotated through 180° from the coupling-engaged position illustrated in FIG. 1 so that the coupling 10 is forced to the right against the bias of the plunger 34 and completely out of engagement with the driving gear member 18 as shown in FIG. 3. The lateral offset of the axis of rotation of the cam 24 thus permits this action whilst at the same time the whole driven member 12 is pressed firmly into its gearbox through the action of the spring loaded plunger 34 transmitting its bias through the cam onto the axially outer face of the gear member 18. To re-engage the coupling 10 onto the driving member 12, the cam 24 is rotated through 180° during which rotation of the plunger 34 will at all times exert a bias of the cam upon the axially outer face of the gear member 18 thus preventing any tendency of the shaft 16 to become disengaged from its co-operating element in the gearbox.

It will be readily understood that, in the coupling-disengaged position of the cam as shown in FIG. 3, and when the vehicle is being towed the driving gear wheel 18 will be stationary whilst the driven gear wheel 22 together with the coupling 10 will rotate. In this position the recess 38 is engaged with the head of the bearing button 42 so that free rotation of the coupling 10 and the cam 24 may occur relative to the stationary driving gear wheel 18. In this position also, the recess 40, which is engaged with the bearing button 42 in the coupling-engaged position will now be engaged with the head of the plunger 34.

An altervative construction of the cam member is shown in FIGS. 4 and 5 of the drawings wherein like reference numerals refer to like parts already described. In this construction the cam 24 is similarly mounted for rotation about the axis of its shaft 26 but is provided with a circumferential cam track 44. Engaged at all times within the cam track 44 is a cam track follower pin 46 carried at the axially outer end of a bracket 48 fast with the driven gear member 22.

FIG. 4 of the drawings shows the coupling in its engaged position and it will be readily apparent that rotation of the cam 24 through 180° will force the coupling to the right as shown in the drawings and into disengagement from the driving gear member 18 i.e. to a position similar to that shown in FIG. 3 of the drawings. In this construction the cam 24 is not directly engaged with the driving gear member 18 at any time and there is thus no need to provide the bearing button 42 on the driving gear member 18.

Although a muff coupling has been described herein having an internally geared surface for engagement about driving and driven gear wheels a coupling in accordance with the invention may be provided having an externally geared surface for engagement within annular driving and driven gear wheels. Alternatively the coupling may be geared internally at one end and externally at the other and need not be of constant diameter over its length.

I claim:

1. A mechanical drive assembly comprising a driving gear member, a driven gear member axially spaced therefrom and a mechanical coupling therebetween wherein the coupling is provided with gearing to cooperate with said driving and driven gear members whereby rotational drive may be transmitted through the coupling from said driving gear member to said driven gear member; said coupling being axially moveable relative to said gear members so as to be selectively disengageable from at least one of said members; a cam member carried by said coupling and having opposed cam faces engageable with axially opposed faces of the driving and driven gear members, the cam member being rotatable between a first position in which one of said cam faces is engaged with one of said gear members and said coupling is maintained by said cam member in engagement with both of said gear members and a second position in which the other of said cam faces is engaged with said one gear member and said coupling is disengaged from said one gear member and wherein rotation of the cam member between said first and second positions procures movement of the coupling between its engaged and disengaged positions.

2. A mechanical drive assembly as claimed in claim 1 wherein, in the disengaged position of the coupling, the cam member remains engaged with the axially opposed faces of both of said driving and driven gear members.

3. A mechanical drive assembly as claimed in claim 2 wherein movement of the cam member through 180° causes the coupling to move from its engaged position with both of said gear members to its disengaged position in which it is disengaged from the driving gear member.

4. A mechanical drive assembly as claimed in claim 2 wherein, in both the engaged and disengaged positions of the coupling, one said cam face is engaged directly with the driving gear member and the opposed cam face is engaged with a resiliently biased plunger carried by the driven gear member.

5. A mechanical drive assembly as claimed in claim 1 wherein the coupling comprises a sleeve having internal gearing thereon at or adjacent each of its ends for respective co-operation with said driving and driven gear members.

6. A mechanical drive assembly as claimed in claim 5 wherein the cam member is mounted within the sleeve for rotation about an axis extending diametrically across the sleeve intermediate its ends.

7. A mechanical drive assembly comprising a driving gear member, a driven gear member axially spaced therefrom and a mechanical coupling therebetween wherein the coupling is provided with gearing to cooperate with said driving and driven gear members whereby rotational drive may be transmitted through the coupling from said driving gear member to said driven gear member; said coupling being axially moveable relative to said gear members so as to be selectively disengageable from at least one of said members; a cam member carried by said coupling and engageable with the driving and driven gear members, the cam member being rotatable between a first position in which it is engaged with one of said gear members and said coupling is maintained by said cam member in engagement with both of said gear members and a second position in which it is engaged with said one gear member and said coupling is disengaged from said one gear member and wherein rotation of the cam member between the first and second positions procures movement of the coupling between its engaged and disengaged positions.

* * * * *